(12) United States Patent
Sheridan et al.

(10) Patent No.: US 12,188,407 B2
(45) Date of Patent: *Jan. 7, 2025

(54) GAS TURBINE ENGINE BEARING AND GEARBOX ARRANGEMENT

(71) Applicant: RTX CORPORATION, Farmington, CT (US)

(72) Inventors: William G. Sheridan, Southington, CT (US); Michael E. McCune, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,270

(22) Filed: Feb. 10, 2023

(65) Prior Publication Data
US 2023/0193818 A1 Jun. 22, 2023

Related U.S. Application Data

(63) Continuation of application No. 16/786,421, filed on Feb. 10, 2020, now Pat. No. 11,608,779, which is a
(Continued)

(51) Int. Cl.
*F02C 3/107* (2006.01)
*F02C 7/06* (2006.01)
(Continued)

(52) U.S. Cl.
CPC ............... *F02C 3/107* (2013.01); *F02C 7/06* (2013.01); *F02C 7/36* (2013.01); *F02K 3/06* (2013.01);
(Continued)

(58) Field of Classification Search
None
See application file for complete search history.

(56) References Cited

U.S. PATENT DOCUMENTS 2,258,792 A 10/1941 New
2,936,655 A 5/1960 Peterson et al.
(Continued)

FOREIGN PATENT DOCUMENTS

EP 0791383 A1 8/1997
EP 1142850 A1 10/2001
(Continued)

OTHER PUBLICATIONS

QCSEE the aerodynamic and mechanical design of the QCSEE under-the-wing fan. (1977). NASA-CR-135009. Mar. 1, 1977. pp. 1-137.
(Continued)

*Primary Examiner* — Juan G Flores
(74) *Attorney, Agent, or Firm* — Carlson, Gaskey & Olds, P.C.

(57) ABSTRACT

A gas turbine engine includes a propulsor and a drive gear system. The drive gear system includes at least one ring gear, a plurality of intermediate gears positioned between and enmeshing with a sun gear and the at least one ring gear, with the plurality of intermediate gears carried by a gear carrier. A first bearing is configured to rotate with the gear carrier. A second bearing is on an opposite side of the drive gear system from the first bearing.

24 Claims, 1 Drawing Sheet

Related U.S. Application Data continuation of application No. 15/828,510, filed on Dec. 1, 2017, now Pat. No. 10,563,576, which is a continuation of application No. 14/207,718, filed on Mar. 13, 2014, now Pat. No. 9,885,282.

(60) Provisional application No. 61/789,193, filed on Mar. 15, 2013.

(51) Int. Cl.
  *F02C 7/36* (2006.01)
  *F02K 3/06* (2006.01)
(52) U.S. Cl.
  CPC ............. *F05D 2260/403* (2013.01); *F05D 2260/4031* (2013.01)

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,664,612 A | 5/1972 | Skidmore et al. | |
| 3,747,343 A | 7/1973 | Rosen | |
| 3,754,484 A | 8/1973 | Roberts | |
| 3,765,623 A | 10/1973 | Donelson et al. | |
| 3,820,719 A | 6/1974 | Clark et al. | |
| 3,843,277 A | 10/1974 | Ehrich | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Haloff | |
| 4,220,171 A | 9/1980 | Ruehr et al. | |
| 4,240,250 A | 12/1980 | Harris | |
| 4,284,174 A | 8/1981 | Salvana et al. | |
| 4,289,360 A | 9/1981 | Zirin | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,722,357 A | 2/1988 | Wynosky | |
| 4,979,362 A | 12/1990 | Vershure, Jr. | |
| 5,058,617 A | 10/1991 | Stockman et al. | |
| 5,102,379 A | 4/1992 | Pagluica et al. | |
| 5,141,400 A | 8/1992 | Murphy et al. | |
| 5,317,877 A | 6/1994 | Stuart | |
| 5,361,580 A | 11/1994 | Ciokajlo et al. | |
| 5,433,674 A | 7/1995 | Sheridan et al. | |
| 5,447,411 A | 9/1995 | Curley et al. | |
| 5,466,198 A * | 11/1995 | McKibbin ............. | F02C 7/36 475/346 |
| 5,524,847 A | 6/1996 | Brodell et al. | |
| 5,634,767 A | 6/1997 | Dawson | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 6,883,303 B1 | 4/2005 | Seda | |
| 7,021,042 B2 | 4/2006 | Law | |
| 7,219,490 B2 | 5/2007 | Dev | |
| 7,328,580 B2 | 2/2008 | Lee et al. | |
| 7,374,403 B2 | 5/2008 | Decker et al. | |
| 7,412,819 B2 | 8/2008 | Bart et al. | |
| 7,490,460 B2 | 2/2009 | Moniz et al. | |
| 7,490,461 B2 | 2/2009 | Moniz et al. | |
| 7,493,753 B2 | 2/2009 | Moniz et al. | |
| 7,591,754 B2 | 9/2009 | Duong et al. | |
| 7,603,844 B2 | 10/2009 | Moniz et al. | |
| 7,632,064 B2 | 12/2009 | Somanath et al. | |
| 7,662,059 B2 | 2/2010 | McCune | |
| 7,694,505 B2 | 4/2010 | Schilling | |
| 7,726,113 B2 | 6/2010 | Orlando et al. | |
| 7,806,651 B2 | 10/2010 | Kennepohl et al. | |
| 7,824,305 B2 | 11/2010 | Duong et al. | |
| 7,828,682 B2 | 11/2010 | Smook | |
| 7,882,693 B2 | 2/2011 | Schilling | |
| 7,926,260 B2 | 4/2011 | Sheridan et al. | |
| 7,997,868 B1 | 8/2011 | Liang | |
| 8,205,432 B2 | 6/2012 | Sheridan | |
| 10,563,576 B2 | 2/2020 | Sheridan et al. | |
| 11,608,779 B2 * | 3/2023 | Sheridan ............. | F02C 3/107 |
| 2006/0201160 A1 | 9/2006 | Richards | |
| 2006/0228206 A1 | 10/2006 | Decker et al. | |
| 2008/0003096 A1 | 1/2008 | Kohli et al. | |
| 2008/0098715 A1 | 5/2008 | Orlando et al. | |
| 2008/0116009 A1 | 5/2008 | Sheridan et al. | |
| 2008/0148707 A1 | 6/2008 | Schilling | |
| 2008/0317588 A1 | 12/2008 | Grabowski et al. | |
| 2009/0056343 A1 | 3/2009 | Suciu et al. | |
| 2009/0067985 A1 | 3/2009 | Dobek, Jr. et al. | |
| 2009/0304518 A1 | 12/2009 | Kodama et al. | |
| 2009/0314881 A1 | 12/2009 | Suciu et al. | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0331139 A1 | 12/2010 | McCune | |
| 2011/0123326 A1 | 5/2011 | DiBenedetto et al. | |
| 2011/0130246 A1 | 6/2011 | McCune et al. | |
| 2011/0159797 A1 | 6/2011 | Beltman et al. | |
| 2011/0206498 A1 | 8/2011 | McCooey | |
| 2011/0293423 A1 | 12/2011 | Bunker et al. | |
| 2012/0124964 A1 | 5/2012 | Hasel et al. | |
| 2012/0251306 A1 | 10/2012 | Reinhardt et al. | |
| 2013/0025258 A1 | 1/2013 | Merry et al. | |
| 2013/0269479 A1 | 10/2013 | Van Der Merwe et al. | |
| 2020/0191052 A1 * | 6/2020 | Sheridan ............. | F02C 7/06 |

FOREIGN PATENT DOCUMENTS

| | | |
|---|---|---|
| GB | 1516041 A | 6/1978 |
| GB | 2041090 A | 9/1980 |
| GB | 2426792 A | 12/2006 |
| WO | 2007038674 A1 | 4/2007 |

OTHER PUBLICATIONS

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

Quiet clean general aviation turbofan (QCGAT) technology study final report vol. I. (1975). NASA-CR-164222. Dec. 1, 1975. pp. 1-186.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Rauch, D. (1972). Design study of an air pump and integral lift engine ALF-504 using the Lycoming 502 core. Prepare for NASA. Jul. 1972. pp. 1-182.

(56) References Cited

OTHER PUBLICATIONS

Reshotko, M., Karchmer, A., Penko, P.F. and McArdle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology- Opportunities, challenges and readiness status. Porceedings CEAS. Sep. 10-13, 2007. Berlin, Germany. pp. 1-12.

Rolls-Royce M45H. Jane's Aero-engines, Aero-engines—Turbofan. Feb. 24, 2010.

Rotordynamic instability problems in high-performance turbomachinery. (1986). NASA conference publication 2443. Jun. 2-4, 1986.

Roux, E. (2007). Turbofan and turbojet engines database handbook. Editions Elodie Roux. Blagnac: France. pp. 1-595.

Salemme, C.T. and Murphy, G.C. (1979). Metal spar/superhybrid shell composite fan blades. Prepared for NASA. NASA-CR-159594. Aug. 1979. pp. 1-127.

Sargisson, D.F. (1985). Advanced propfan engine technology (APET) and single-rotation gearbox/pitch change mechanism. NASA Contractor Report-168113. R83AEB592. Jun. 1, 1985. pp. 1-476.

Savelle, S.A. and Garrard, G.D. (1996). Application of transient and dynamic simulations to the U.S. Army T55- L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley & Sons, Inc. pp. 722-6 and 764-71.

Shah, D.M. (1992). MoSi2 and other silicides as high temperature structural materials. Superalloys 1992. The Minerals, Metals, Materials Society. pp. 409-422.

Shorter Oxford English Dictionary, 6th Edition. (2007), vol. 2, N-Z, p. 1888.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Singh, A. (2005). Application of a system level model to study the planetary load sharing behavior. Jounal of Mechanical Design. vol. 127. May 2005. pp. 469-76.

Singh, B. (1986). Small engine component technology (SECT) study. NASA CR-175079. Mar. 1, 1986. pp. 1-102.

Singh, R. and Houser, D.R. (1990). Non-linear dynamic analysis of geared systems. NASA-CR-180495. Feb. 1, 1990. pp. 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Smith-Boyd, L. and Pike, J. (1986). Expansion of epicyclic gear dynamic analysis program. Prepared for NASA. NASA CR-179563. Aug. 1986. pp. 1-98.

Sowers, H.D. and Coward, W.E. (1978). QCSEE over-the-wing (OTW) engine acuostic design. NASA-CR-135268. Jun. 1, 1978. pp. 1-52.

Spadaccini, L.J., and Huang, H. (2002). On-line fuel deoxygenation for coke suppression. ASME, Jun. 2002. pp. 1-7.

Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.

Sundaram, S.K., Hsu, J-Y., Speyer, R.F. (1994). Molten glass corrosion resistance of immersed combustion- heating tube materials in soda-lime-silicate glass. J. Am. Ceram. Soc. 77(6). pp. 1613-23.

Sundaram, S.K., Hsu, J-Y., Speyer, R.F. (1995). Molten glass corrosion resistance of immersed combustion- heating tube materials in e-glass. J. Am. Ceram. Soc. 78(7). pp. 1940-46.

Sutliff, D. (2005). Rotating rake turbofan duct mode measurement system. NASA TM-2005-213828. Oct. 1, 2005. pp. 1-34.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-49.

Sweetman, B. and Sutton, O. (1998). Pratt Whitney's surprise leap. Interavia Business Technology, 53.621, p. 25.

Taylor, W.F. (1974). Deposit formation from deoxygenated hydrocarbons. I. General features. Ind. Eng. Chem., Prod. Res. Develop., vol. 13(2). 1974. pp. 133-38.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-8.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Technical Data. Teflon. WS Hampshire Inc. Retrieved from: http://catalog.wshampshire.com/Asset/psg_teflon_ptfe.pdf.

Technical Report. (1975). Quiet Clean Short-haul Experimental Engine (Qcsee) Utw fan preliminary design. NASA-CR-134842. Feb. 1, 1975. pp. 1-98.

Technical Report. (1977). Quiet Clean Short-haul Experimental Engine (QCSEE) Under-the-Wing (UTW) final design report. NASA-CR-134847. Jun. 1, 1977. pp. 1-697.

Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Tummers, B. (2006). DataThief III. Retrieved from: https://datathief.org/DatathiefManual.pdf pp. 1-52.

Turbomeca Aubisque. Jane's Aero-engines, Aero-engines—Turbofan. Nov. 2, 2009.

Turner, M. G., Norris, A., and Veres, J.P. (2004). High-fidelity three-dimensional simulation of the GE90. NASA/TM-2004-212981. pp. 1-18.

Levintan, R.M. (1975). Q-Fan demonstrator engine. Journal of Aircraft. vol. 12( 8). Aug. 1975. pp. 658-63.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Liebeck, R.H., Andrastek, D.A., Chau, J., Girvin, R., Lyon, R., Rawdon, B.K., Scott, P.W. et al. (1995). Advanced subsonic airplane design economics studies. NASA CR-195443. Apr. 1995. pp. 1-187.

Litt, J.S. (2018). Sixth NASA Glenn Research Center propulsion control and diagnostics (PCD) workshop. NASA/CP-2018-219891. Apr. 1, 2018. pp. 1-400.

Lord, W.K., Macmartin, D.G., and Tillman, T.G. (2000). Flow control opportunities in gas turbine engines. American Institute of Aeronautics and Astronautics. pp. 1-15.

Lynwander, P. (1983). Gear drive systems: Design and application. New York, New York: Marcel Dekker, Inc. pp. 145, 355-358.

MacIsaac, B. and Langston, R. (2011). Gas turbine propulsion systems. Chichester, West Sussex: John Wiley & Sons, Ltd. pp. 260-5.

(56) References Cited

OTHER PUBLICATIONS

Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.
Mattingly, J.D. (1996). Elements of gas turbine propulsion. New York, New York: McGraw-Hill, Inc. pp. 8-15.
Mavris, D.N., Schutte, U.S. (2016). Application of deterministic and probabilistic system design methods and enhancements of conceptual design tools for ERA project final report. NASA/CR-2016-219201. May 1, 2016. pp. 1-240.
McArdle, J.G. and Moore, A.S. (1979). Static test-stand performance of the YF-102 turbofan engine with several exhaust configurations for the Quiet Short-Haul Research Aircraft (QSRA). Prepared for NASA. NASA-TP-1556. Nov. 1979. pp. 1-68.
McCracken, R.C. (1979). Quiet short-haul research aircraft familiarization document. NASA-TM-81149. Nov. 1, 1979. pp. 1-76.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.
Meier N. (2005) Civil Turbojet/Turbofan Specifications. Retrieved from http://jet-engine.net/civtfspec.html.
Merriam-Webster's collegiate dictionary, 10th Ed. (2001). p. 1125-1126.
Merriam-Webster's collegiate dictionary, 11th Ed. (2009). p. 824.
Meyer, A.G. (1988). Transmission development of TEXTRON Lycoming's geared fan engine. Technical Paper. Oct. 1988. pp. 1-12.
Middleton, P. (1971). 614: VFW's jet feederliner. Flight International, Nov. 4, 1971. p. 725, 729-732.
Misel, O.W. (1977). QCSEE main reduction gears test program. NASA CR-134669. Mar. 1, 1977. pp. 1-222.
Moxon, J. How to save fuel in tomorrow's engines. Flight International. Jul. 30, 1983. 3873(124). pp. 272-273.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Munt, R. (1981). Aircraft technology assessment: Progress in low emissions engine. Technical Report. May 1981. pp. 1-171.
Nanocor Technical Data for Epoxy Nanocomposites using Nanomer 1.30E Nanoclay. Nnacor, Inc. Oct. 2004.
NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.
Neitzel, R., Lee, R., and Chamay, A.J. (1973). Engine and installation preliminary design. Jun. 1, 1973. pp. 1-333.
Neitzel, R.E., Hirschkron, R. and Johnston, R.P. (1976). Study of unconventional aircraft engines designed for low energy consumption. NASA-CR-135136. Dec. 1, 1976. pp. 1-153.
Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.
Norton, M. and Karczub, D. (2003). Fundamentals of noise and vibration analysis for engineers. Press Syndicate of the University of Cambridge. New York: New York. p. 524.
Oates, G.C. (Ed). (1989). Aircraft propulsion systems and technology and design. Washington, D.C.: American Institute of Aeronautics, Inc. pp. 341-344.
Office action for U.S. Appl. No. 14/207,718, dated Jan. 6, 2017, 11 pages.
Parametric study of STOL short-haul transport engine cycles and operational techniques to minimize community noise Impact. NASA-CR-114759. Jun. 1, 1974. pp. 1-397.
Parker, R.G. and Lin, J. (2001). Modeling, modal properties, and mesh stiffness variation instabilities of planetary gears. Prepared for NASA. NASA/CR-2001-210939. May 2001. pp. 1-111.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. Vol. 22(3). 2001. pp. 59-64.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Product Brochure. Garrett TFE731. Allied Signal. Copyright 1987. pp. 1-24.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III- mechanical performance. (1978). NASA-CR-135325. Feb. 1, 1978. pp. 1-112.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
2003 NASA seal/secondary air system workshop. (2003). NASA/CP-2004-212963/vol. 1. Sep. 1, 2004. pp. 1-408.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley Sons, Inc. New York: New York. pp. 1-11, 13-23, 26-33, 50-1, 56-8, 60-1, 64-71, 87-9, 324-9, 436-7.
AGMA Standard (1997). Design and selection of components for enclosed gear drives. lexandria, VA: American Gear Manufacturers Association. pp. 1-48.

(56) References Cited

OTHER PUBLICATIONS

AGMA Standard (1999). Flexible couplings—Mass elastic properties and other characteristics. Alexandria, VA: American Gear Manufacturers Association. pp. 1-46.

AGMA Standard (2006). Design manual for enclosed epicyclic gear drives. Alexandria, VA: American Gear Manufacturers Association. pp. 1-104.

Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.

Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.

Anderson N.E., "An Analytical Method to Predict Efficiency of Aircraft Gearboxes," NASA, Technical Memorandum 83716 (AIAA-84-1500).

Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Avco Lycoming Divison. ALF 502L Maintenance Manual. Apr. 1981. pp. 1-118.

Aviadvigatel D-110. Jane's Aero-engines, Aero-engines—Turbofan. Jun. 1, 2010.

Awker, R.W. (1986). Evaluation of propfan propulsion applied to general aviation. NASA CR-175020. Mar. 1, 1986. pp. 1-140.

Baker, R.W. (2000). Membrane technology and applications. New York, NY: McGraw-Hill. pp. 87-153.

Berton, J.J. and Guynn, M.D. (2012). Multi-objective optimization of a turbofan for an advanced, single-aisle transport. NASA/TM-2012-217428. pp. 1-26.

Bessarabov, D.G., Jacobs, E.P., Sanderson, R.D., and Beckman, I.N. (1996). Use of nonporous polymeric lat-sheet gas-separation membranes in a membrane-liquid contactor: experimental studies. Journal of Membrane Sciences, vol. 113. 1996. pp. 275-84.

Bloomer, H.E. and Loeffler, I.J. (1982). QCSEE over-the-wing engine acoustic data. NASA-TM-82708. May 1, 1982. pp. 1-558.

Bloomer, H.E. and Samanich, N.E. (1982). QCSEE under-the-wing engine acoustic data. NASA-TM-82691. May 1, 1982. pp. 1-28.

Bloomer, H.E. and Samanich, N.E. (1982). QCSEE under-the-wing enging-wing-flap aerodynamic profile characteristics. NASA-TM-82890. Sep. 1, 1982. pp. 1-48.

Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.

Bornstein, N. (1993). Oxidation of advanced intermetallic compounds. Journal de Physique IV, 1993, 03 (C9), pp. C9-367-C9-373.

Brennan, P.J. and Kroliczek, E.J. (1979). Heat pipe design handbook. Prepared for National Aeronautics and Space Administration by B & K Engineering, Inc. Jun. 1979. pp. 1-348.

Brines, G.L. (1990). The turbofan of tomorrow. Mechanical Engineering: The Journal of the American Society of Mechanical Engineers, 108(8), 65-67.

Bucknell, R.L. (1973). Influence of fuels and lubricants on turbine engine design and performance, fuel and ubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.

Carney, K., Pereira, M. Revilock, and Matheny, P. (2003). Jet engine fan blade containment using two alternate geometries. 4th European LS-DYNA Users Conference. pp. 1-10.

Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.

Cheryan, M. (1998). Ultrafiltration and microfiltration handbook. Lancaster, PA: Tecnomic Publishing Company, Inc. pp. 171-236.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Clarke, D.R. and Levi, C.G. (2003). Materials design for the next generation thermal barrier coatings. Annual. Rev. Mater. Res. vol. 33. 2003. pp. 383-417.

Cramoisi, G. Ed. (2012). Death in the Potomac: The crash of Air Florida Flight 90. Air Crash Investigations. Accident Report NTSB/AAR-82-8. p. 45-47.

Cusick, M. (1981). Avco Lycoming's ALF 502 high bypass fan engine. Society of Automotive Engineers, Inc. Business Aircraft Meeting Exposition. Wichita, Kansas. Apr. 7-10, 1981. pp. 1-9.

Daggett, D.L., Brown, S.T., and Kawai, R.T. (2003). Ultra-efficient engine diameter study. NASA/CR-2003-212309. May 2003. pp. 1-52.

Dalton, III., W.N. (2003). Ultra high bypass ratio low noise engine study. NASA/CR-2003-212523. Nov. 2003. pp. 1-187.

Daly, M. Ed. (2008). Jane's Aero-Engine. Issue Twenty-three. Mar. 2008. p. 707-12.

Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.

Darrah, S. (1987). Jet fuel deoxygenation. Interim Report for Period Mar. 1987-Jul. 1988. pp. 1-22.

Dassault Falcon 900EX Easy Systems Summary. Retrieved from: http://www.smartcockpit.com/docs/F900EX-Engines.pdf pp. 1-31.

Datasheet. CF6-80C2 high-bypass turbofan engines. Retreived from https://geaviation.com/sites/default/files/datasheet-CF6-80C2.pdf.

Datasheet. CFM56-5B for the Airbus A320ceo family and CFM56-7B for the Boeing 737 family. https://www.cfmaeroengines.com/.

Datasheet. Genx ™ high bypass turbofan engines. Retreived from: https://www.geaviation.com/sites/default/files/datasheet-genx.pdf.

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.

Davis, D.G.M. (1973). Variable-pitch fans: Progress in Britain. Flight International. Apr. 19, 1973. pp. 615-7.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Declaration of Dr. Magdy Attia, In re U.S. Pat. No. 8,313,280, Executed Oct. 21, 2016, pp. 1-88.

Declaration of Dr. Magdy Attia, In re U.S. Pat. No. 8,517,668, Executed Dec. 8, 2016, pp. 1-81.

Declaration of John Eaton, Ph.D. In re U.S. Pat. No. 8,689,568, Executed Mar. 28, 2016, pp. 1-87.

Declaration of Reza Abhari, In re U.S. Pat. No. 8,448,895, Executed Nov. 28, 2016, pp. 1-81.

Declaration of Reza Abhari. In re U.S. Pat. No. 8,695,920, claims 1-4, 7-14, 17 and 19, Executed Nov. 29, 2016, pp. 1-102.

Declaration of Reza Abhari. In re U.S. Pat. No. 8,695,920. Executed Nov. 30, 2016, pp. 1-67.

Declaration of Reza Abhari, Ph.D. In re U.S. Pat. No. 8,844,265, Executed Jun. 28, 2016, pp. 1-91.

Defeo, A. and Kulina, M. (1977). Quiet clean short-haul experimental engine (QCSEE) main reduction gears detailed design final report. Prepared for NASA. NASA-CR-134872. Jul. 1977. pp. 1-157.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

(56) References Cited

OTHER PUBLICATIONS

Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite- element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-22.
El-Sayad, A.F. (2008). Aircraft propulsion and gas turbine engines. Boca Raton, FL: CRC Press. pp. 215-9 and 855-60.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in bure compound systems. Ind. Eng. Chem., Prod. Res. Dev., vol. 19(1). 1978. pp. 65-70.
Garret TFE731 Turbofan Engine (CAT C). Chapter 79: Lubrciation System. TTFE731 Issue 2. 2010. pp. 1-24.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.
Hess, C. (1998). Pratt Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-8.
Hill, P.G., Peterson, C.R. (1992). Mechanics and thermodynamics of propulsion, 2nd Edition. Addison-Wesley Publishing Company, Inc. pp. 400-6.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.

(56) References Cited

OTHER PUBLICATIONS

Honeywell LF502. Jane's Aero-engines, Aero-engines—Turbofan. Aug. 17, 2016.
Honeywell LF507. Jane's Aero-engines, Aero-engines—Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines—Turbofan. Jul. 18, 2012.
Honeywell TFE731 Pilot Tips. pp. 1-143.
Honeywell TFE731-5AR to -5BR Engine Conversion Program. Sep. 2005. pp. 1-4.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Search Report and Written Opinion for PCT Application No. PCT/US2014/026446 dated on Jun. 25, 2014.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
Jane's—Ivchenko Progress 727 Geared Turbofan, Feb. 7, 2007.
Jeng, Y.-L., Lavernia, E.J. (1994). Processing of molybdenum disilicide. J. of Mat. Sci. vol. 29. 1994. pp. 2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week Space Technology, 148(8). p. 34-5.
Kandebo, S.W. (1998). Geared-Turbofan engine design targets cost, complexity. Aviation Week & Space Technology, 148(8). p. 34-5.
Kandebo, S.W. (1998). Pratt & Whitney launches geared turbofan engine. Aviation Week Space Technology, 148(8). p. 32-4.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press. p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Kurzke, J. (2012). GasTurb 12: Design and off-design performance of gas turbines. Retrieved from: https://www.scribd.com/document/153900429/GasTurb-12.
Angston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for

(56) References Cited

OTHER PUBLICATIONS

C/SiC based on yttrium silicate. Journal of European Ceramic Society vol. 18. 1998. pp. 2345-2350.

Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003 pp. 1-47.

Whitaker, R. (1982). ALF 502: plugging the turbofan gap. Flight International, p. 237-241, Jan. 30, 1982.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Wikipedia. Stiffness. Retrieved Jun. 28, 2018 from: https://en.wikipedia.org/wiki/Stiffness.

Wikipedia. Torsion spring. Retreived Jun. 29, 2018 from: https://en.wikipedia.org/wiki/Torsion_spring.

Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.

Willis, W.S. (1979). Quiet clean short-haul experimental engine (QCSEE) final report. NASA/CR-159473 pp. 1-289.

Winn, A. (Ed). (1990). Wide Chord Fan Club. Flight International, 4217(137). May 23-29, 1990. pp. 34-38.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Xie, M. (2008). Intelligent engine systems: Smart case system. NASA/CR-2008-215233. pp. 1-31.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Zalud, T. (1998). Gears put a new spin on turbofan performance. Machine Design, 70(20), p. 104.

Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.

Zhao, J.C. and Westbrook, J.H. (2003). Ultrahigh-temperature materials for jet engines. MRS Bulletin. vol. 28(9). Sep. 2003. pp. 622-630.

\* cited by examiner

GAS TURBINE ENGINE BEARING AND GEARBOX ARRANGEMENT

CROSS-REFERENCE TO RELATED APPLICATIONS

The present disclosure is a continuation of U.S. patent application Ser. No. 16/786,421 filed Feb. 10, 2020, which is a continuation of U.S. patent application Ser. No. 15/828,510, filed Dec. 1, 2017, which is now U.S. Pat. No. 10,563,576 granted Feb. 18, 2020, which is a continuation of U.S. patent application Ser. No. 14/207,718, filed Mar. 13, 2014, which is now U.S. Pat. No. 9,885,282 granted Feb. 6, 2018, which claims the benefit of U.S. Provisional Patent Application Ser. No. 61/789,193, filed Mar. 15, 2013, and entitled "Turbofan Engine Bearing and Gearbox Arrangement", the disclosure of which is incorporated by reference herein in its entirety as if set forth at length.

BACKGROUND

The disclosure relates to turbofan engines. More particularly, the disclosure relates to main bearing arrangements for turbofan engines having epicyclic gear reductions.

Gas turbine engines and similar structures feature a number of subassemblies mounted for rotation relative to a fixed case structure. Such engines have a number of main bearings reacting radial and/or thrust loads. Examples of such bearings are rolling element bearings such as ball bearings and roller bearings. Typically such bearings all react radial loads. Some such bearings also react axial (thrust) loads (either unidirectionally or bidirectionally). Ball bearings typically react thrust loads bidirectionally. However, if the inner race is configured to engage just one longitudinal side of the balls while the outer race engages the other longitudinal side, the ball bearing will react thrust unidirectionally.

Tapered roller bearings typically react thrust unidirectionally. Two oppositely-directed tapered roller bearings may be paired or "duplexed" to react thrust bidirectionally. An example is found in the fan shaft bearings of U.S. Patent Application Publication 2011/0123326A1. Such fan shaft bearings are widely spaced to behave as two distinct bearings providing radial support at two spaced locations so as to adequately react overturning moments or torques normal to the bearing axis (e.g., pitch and yaw) and thus fully support the fan. Other duplexing examples involve closely spaced bearings which behave as a single bearing and their combination may be referred to as a single duplex bearing. Such a single duplex may need to have a longitudinally spaced apart additional bearing reacting radial loads (and optionally thrust loads) for their combination to react yaw and pitch loads.

US Patent Application Publications 2013/0025257A1 and 2013/0025258A1 disclose so-called three-spool engines wherein a high pressure spool comprises a high pressure compressor (HPC) and a high pressure turbine (HPT) respectively upstream of and downstream of a combustor. An intermediate spool comprises an intermediate pressure compressor (IPC) upstream of the HPC and an intermediate pressure turbine (IPT) downstream of the HPT. A low spool comprises a low pressure turbine (LPT) downstream of the IPT and driving the fan via a fan drive gear system. The exemplary low spool comprises only the LPT and associated shaft assembly and does not include any compressor stages.

Unless explicitly or implicitly indicated otherwise, the term "bearing" designates an entire bearing system (e.g., inner race, outer race and a circumferential array of rolling elements) rather than the individual rolling elements. The term "main bearing" designates a bearing used in a gas turbine engine to support the primary rotating structures within the engine that produce thrust. This is distinguished, for example, from an accessory bearing (which is a bearing that supports rotating structures that do not produce thrust such as the fuel pump or oil pump bearings in an accessory gearbox).

SUMMARY

One aspect of the disclosure involves a turbofan engine. A fan shaft couples a fan drive gear system to the fan. A low spool comprises a low pressure turbine, and a low shaft coupling the low pressure turbine to the fan drive gear system. A core spool comprises a high pressure turbine, a compressor, and a core shaft coupling the high pressure turbine to the core spool compressor. A first bearing engages the fan shaft, the first bearing being a thrust bearing. A second bearing engages the fan shaft on an opposite side of the fan drive gear system from the first bearing. The second bearing being is a roller bearing. A third bearing engages the low spool shaft and the fan shaft.

In one or more embodiments of any of the foregoing embodiments, the third bearing is a thrust bearing.

In one or more embodiments of any of the foregoing embodiments, the first bearing is a tapered roller bearing oriented to resist at least forward movement of the fan shaft.

In one or more embodiments of any of the foregoing embodiments, the engine further comprises: a fourth bearing engaging the low spool shaft and a fixed frame; and a fifth bearing engaging the low spool shaft and an intermediate spool shaft.

In one or more embodiments of any of the foregoing embodiments, the fourth and fifth bearings are roller bearings.

In one or more embodiments of any of the foregoing embodiments, the fixed frame is aft of the low pressure turbine.

In one or more embodiments of any of the foregoing embodiments, the engine further comprises: a sixth bearing engaging the intermediate spool shaft and the case; a seventh bearing engaging the core spool shaft and the case; and an eighth bearing engaging the core spool shaft and the case.

In one or more embodiments of any of the foregoing embodiments, the sixth and seventh bearings are thrust bearings.

In one or more embodiments of any of the foregoing embodiments, the low spool shaft engages the third bearing and two additional bearings.

In one or more embodiments of any of the foregoing embodiments, a centerplane of the third bearing is behind a centerplane of the second bearing by a distance no more than 15% of a radius of the second bearing.

Another aspect of the disclosure involves a turbofan engine. A fan shaft couples a fan drive gear system having a gear carrier to the fan. A low spool comprises a low pressure turbine and a low shaft coupling the low pressure turbine to the fan drive gear system. A core spool comprises a high pressure turbine, a compressor, and a core shaft coupling the high pressure turbine to the core spool shaft. The fan shaft is mounted to rotate with the gear carrier as a unit and said unit engages a first bearing forward of the gear carrier and engages a second bearing aft of the gear carrier.

In one or more embodiments of any of the foregoing embodiments, said first bearing is a tapered roller bearing oriented to resist forward movement of the unit and said second bearing is a roller bearing engaging the unit and a fixed case structure.

In one or more embodiments of any of the foregoing embodiments, the engine further comprises a third bearing engaging the unit and the low shaft.

In one or more embodiments of any of the foregoing embodiments, a centerplane of the third bearing is behind a centerplane of the second bearing by a distance no more than 15% of a radius of the second bearing.

In one or more embodiments of any of the foregoing embodiments, the engine further comprises: a fourth bearing engaging the low spool shaft and a fixed frame; and a fifth bearing engaging the low spool shaft and an intermediate spool shaft.

In one or more embodiments of any of the foregoing embodiments, the fourth and fifth bearing are roller bearings.

In one or more embodiments of any of the foregoing embodiments, the fixed frame is aft of the low pressure turbine.

In one or more embodiments of any of the foregoing embodiments, the engine further comprises: a sixth bearing engaging the intermediate spool shaft and the case; a seventh bearing engaging the core spool shaft and the case; and an eighth bearing engaging the core spool shaft and the case.

In one or more embodiments of any of the foregoing embodiments, the sixth and seventh bearings are thrust bearings.

In one or more embodiments of any of the foregoing embodiments, the first bearing is thrust bearing and the second bearing is roller bearing.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
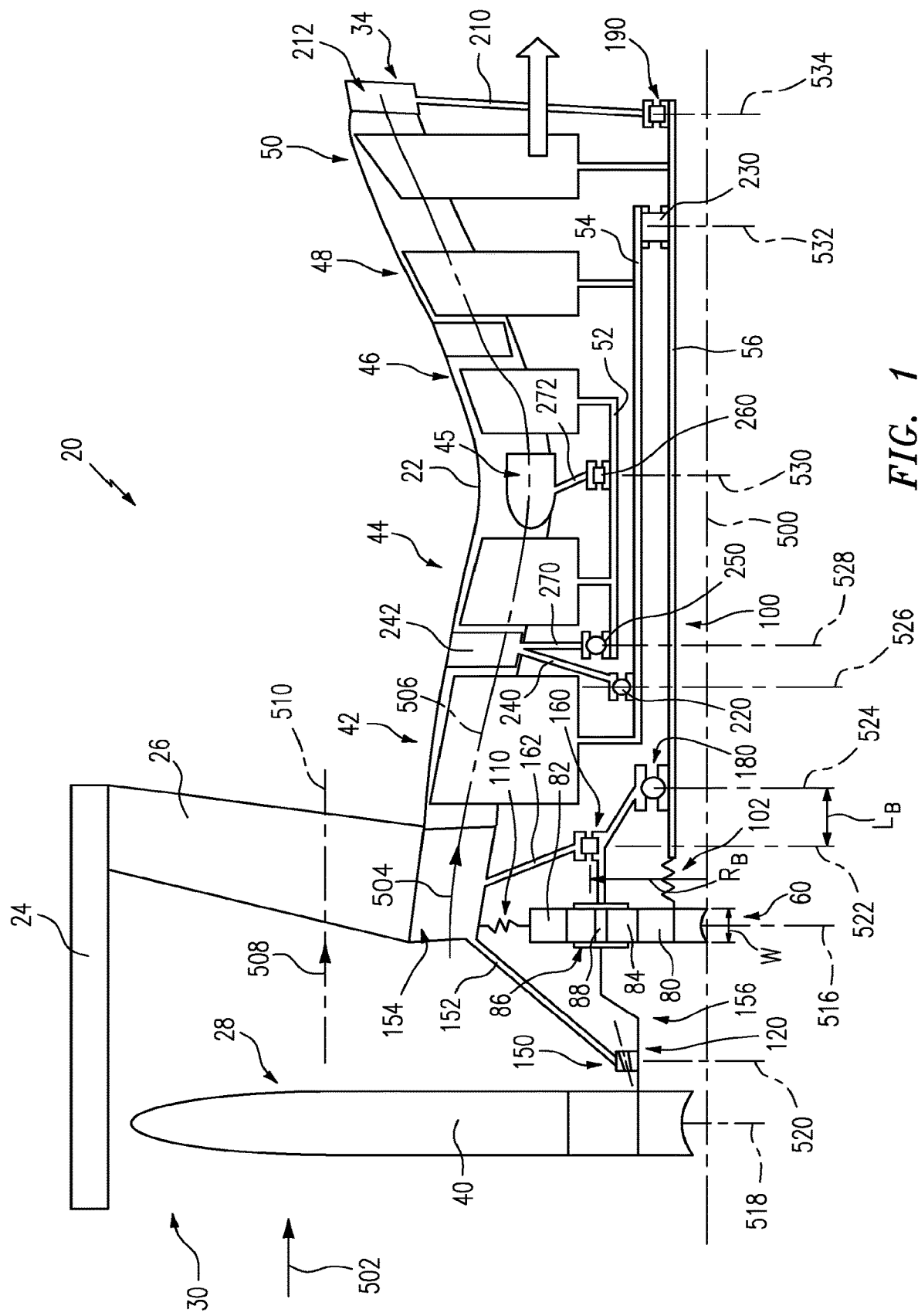
FIG. 1 is a schematic longitudinal sectional view of a turbofan engine.

FIG. 1 shows a turbofan engine 20 having a central longitudinal axis or centerline 500. The engine has a structural case including a core case 22. The exemplary structural case further comprises a fan case 24 connected to the core case by a circumferential array of struts 26 and surrounding the fan 28. The core case and the fan case may have respective outboard aerodynamic nacelles (not shown).

The exemplary forward rim of the fan case is proximate an engine inlet 30 receiving an inlet flow 502 when the engine is operating. The inlet flow passes downstream through the fan 28 and divides into a core flow 504 passing inboard along a core flowpath 506 within the core case and a bypass flow 508 passing outboard along a bypass flowpath 510 between the core case 22 and the fan case 24.

The core flow 504 (or a major portion thereof allowing for bleeds, etc.) passes sequentially through one or more compressor sections, a combustor, and one or more turbine sections before exiting a core outlet 34. In the exemplary engine the fan is a single-stage fan having a single stage of fan blades 40. Each of the compressor and turbine sections may include one or more blade stages mounted to rotate as a unit about the centerline 500. The blade stages may be alternatingly interspersed with vane stages. Each compressor section is co-spooled with an associated turbine section. From upstream to downstream along the core flowpath, the exemplary engine has two compressor sections 42 and 44, the combustor 45, and three turbine sections 46, 48, and 50. The fan and compressor sections (and their stages) progressively compress inlet air which passes into the combustor for combustion with fuel to generate high pressure gas which passes downstream through the turbine sections where the gas pressure is progressively reduced as work is extracted. The turbine section 46 operates at highest pressure and is often referred to as a high pressure turbine (HPT) or a core turbine. The HPT blade stages are connected via a shaft 52 ("high shaft" or "core shaft") to the blade stages of the compressor section 44 to drive that compressor section (often referred to as a high pressure compressor (HPC) or core compressor) to form a high spool or core spool.

The turbine section 48 operates at an intermediate pressure range and is thus often referred to as an intermediate pressure turbine (IPT). The IPT blade stages are connected via a shaft 54 ("intermediate shaft") to the compressor section 42 to drive that compressor section (often referred to as an intermediate pressure compressor (IPC)) to form an intermediate spool.

The turbine section 50 operates at a low pressure range and is thus often referred to as a low pressure turbine (LPT). The LPT blade stages are connected via a shaft 56 ("low shaft") to a transmission 60 (e.g., an epicyclic transmission, more particularly a geared system known as a fan drive gear system (FDGS)) to indirectly drive the fan 28 with a speed reduction.

An exemplary high pressure turbine 46 is a single or double stage turbine assembly; an exemplary intermediate stage turbine 48 is a single or double stage turbine assembly; an exemplary low pressure turbine 50 is a multi-stage turbine (e.g., three or more).

The exemplary transmission comprises a central externally-toothed sun gear 80. The sun gear 80 is encircled by an internally-toothed ring gear 82. A number of externally-toothed star or planet gears 84 are positioned between and enmeshed with the sun gear 80 and ring gear 82. The star or planet gears 84 can be referred to as intermediate gears. A cage or carrier assembly 86 carries the intermediate gears via associated bearings 88 for rotation about respective axes. The bearings 88 may be rolling element bearings or journal bearings (e.g., having external circumferential surface portions closely accommodated within internal bore surfaces of the associated intermediate gears 84).

The exemplary carrier assembly 86 comprises a front plate (e.g., annular) in front of the gears and a rear plate (e.g., annular) behind the gears. These plates may be mechanically connected by the bearings 88 and/or by linking portions between adjacent intermediate gears.

In the exemplary embodiment, a forward end of the low shaft 56 is coupled to the sun gear 80. The exemplary low shaft 56 has a generally rigid main portion 100 and a flexible forward portion 102. A forward end of the portion 102 may have a splined outer diameter (OD) surface interfitting with a splined inner diameter (ID) surface of the sun gear 80 to transmit rotation.

The exemplary ring gear 82 is substantially non-rotatably mounted relative to the engine case. In the exemplary embodiment, the ring gear 82 is coupled to the case 22 via a compliant flexure 110 that allows at least small temporary radial and axial excursions and rotational excursions transverse to the centerline 500.

The exemplary carrier assembly 86 is coupled to the fan 28 to rotate with the fan 28 as a unit. In the exemplary embodiment a main fan shaft 120 connects the fan 28 to the carrier assembly 86.

The speed reduction ratio is determined by the ratio of diameters of the ring gear 82 to the sun gear 80. This ratio will substantially determine the maximum number of intermediate gears 84 in a given ring 82. The actual number of intermediate gears 84 will be determined by stability and stress/load sharing considerations. An exemplary reduction is between about 2:1 and about 13:1. Although only one intermediate gear 84 is necessary, in exemplary embodiments, the number of intermediate gears 84 may be between about three and about eleven. An exemplary gear layout with fixed carrier is found in U.S. Patent Application Publication 2012/0251306A1.

Thus, the exemplary engine 20 has four main rotating components (units) rotating about the centerline 500: the core spool (including the high pressure turbine 46, the high shaft 52, and the high pressure compressor 44); the intermediate spool (including the intermediate pressure turbine 48, the intermediate shaft 54, and the intermediate pressure compressor 42); the low spool (including the low pressure turbine 50 and low shaft 56); and the fan assembly (including the fan 28 itself and the fan shaft 120). Each of these four things needs to be supported against: radial movement; overturning rotations transverse to the centerline 500; and thrust loads (parallel to the axis 500). Radial and overturning movements are prevented by providing at least two main bearings engaging each of the four units. As is discussed below, such at least two are sufficiently axially spaced to resist the overturning movements.

Each unit would have to also engage at least one thrust bearing. The nature of thrust loads applied to each unit will differ. Accordingly, the properties of required thrust bearings may differ. For example, the fan 28 primarily experiences forward thrust and, therefore, the thrust bearings engaging the fan 28 may be configured to address forward thrust but need not necessarily address rearward thrusts of similar magnitudes, durations, etc.

Previously-proposed gear-reduced turbofan engines have placed two main bearings along the fan shaft forward of the transmission. The FIG. 1 embodiment, however, places only a single bearing 150 forward of the transmission 60. Inboard, the inner race of this exemplary bearing 150 engages a forward portion of the shaft 120 aft of the fan. Outboard, the outer race of the bearing 150 engages static structure of the case. The exemplary static structure comprises a support 152 extending inward from a forward frame 154.

To provide the required second bearing for the fan unit, the fan shaft effectively extends through the transmission by integrating the carrier assembly 86 into the fan shaft 120. Thus, the carrier assembly 86 is rigidly connected to a forward portion 156 of the fan shaft 120 ahead of the transmission 60 and an aft portion 158 of the fan shaft 120 aft of the transmission 60. The carrier assembly 86 and fan shaft 120 thus rotate as a unit. The exemplary fan shaft 120 aft portion 158 is supported by a bearing 160. The exemplary bearing 160 also supports the fan shaft 120 relative to the static structure (e.g., via a rear support 162 extending inward from the forward frame 154 behind the transmission 60). These two bearings 150, 160 thus prevent radial excursions and overturning moments which the fan 28 may produce during flight.

To resist thrust loads, one or both of the bearings 150, 160 may be thrust bearings. In an exemplary embodiment, the bearing 160 is a non-thrust bearing (e.g., a straight roller bearing with longitudinal roller axes configured to only handle radial loads). The other bearing (i.e., the bearing 150) is a thrust bearing. Due to the significance of forward thrust loads on the fan 28, the bearing 150 may be biased to resist forward loads. The exemplary bearing 150 is a bidirectional ball bearing or a bidirectional tapered roller bearing (e.g., wherein the rollers have a forward taper and forwardly converging roller axes to preferentially handle the forward thrust loads). A similar bidirectional tapered roller bearing is shown in U.S. Pat. No. 6,464,401 of Allard entitled "High Load Capacity Bi-Directional Tapered Roller Bearing". Ball bearings are typically bidirectional thrust bearings. However, a unidirectional ball bearing may be formed by having at least one of the races contacting only a single longitudinal side of the balls.

An exemplary bearing arrangement for supporting the remaining three units is discussed below. Various aspects of each of these may be independently implemented or all may be implemented in a given engine. The low shaft 56 is principally supported by a forward bearing 180 and an aft bearing 190. Although the forward bearing 180 might be directly grounded to the case 22 (e.g., via a bearing support extending inward from the frame 154 aft of the support 162), the exemplary bearing 180 is indirectly grounded to the case 22 via the fan shaft 120 and bearing 160. A rearmost portion 200 of the fan shaft 120 extends aft from the inner race of the bearing 160 to the outer race of the bearing 180. Thus, radial loads to the bearing 180 are transmitted through the aft portion 200, the bearing 160, and the support 162.

The exemplary bearing 190 is grounded to the case 22 via a support 210 extending inward from a frame 212 extending across the core flowpath 504. The exemplary support 210 is aft of the LPT 50 with the frame 212 being a turbine exhaust frame. Alternative implementations may shift the support 210 forward of the LPT 50 to engage an inter-turbine frame between the turbine sections 48 and 50.

One of the bearings 180 and 190 may be a non-thrust bearing such as a roller bearing (e.g., such as a straight roller bearing) with the other being a thrust bearing. The exemplary bearing 190 is a straight roller bearing. The exemplary bearing 180 is a thrust bearing (e.g., a bidirectional ball bearing). Thus, thrust loads on the low spool are transmitted via the shaft 56 through the bearing 180, through the fan shaft 120, to the bearing 150, and grounded back through the support 152.

The intermediate spool is supported by forward bearing 220 and an aft bearing 230. In an exemplary embodiment, the forward bearing 220 directly radially supports or grounds the intermediate spool via a support 240 extending to an inter-compressor frame 242 between the compressor sections 42 and 44. Alternative embodiments might shift this support forward to the front frame 154. The bearing 230 indirectly supports or grounds the intermediate spool by engaging the intermediate spool and the low spool or, namely, engaging the intermediate shaft 54 and the low shaft 56.

With the bearing 230 more relatively near to the bearing 190 than near to the bearing 180, the radial loads on the intermediate spool at the bearing 230 will primarily be transmitted to the low shaft 56 and through an aft portion of the low shaft 56 to the bearing 190 and grounded by the support 210 and frame 212. The exemplary bearing 230 is thus a straight roller bearing transmitting essentially only radial loads. The bearing 220 is, however, a thrust bearing (e.g., a bidirectional ball bearing) which handles the thrust loads on the intermediate spool. In alternative embodiments, however, the bearing 230 could directly ground the intermediate spool by having its inner race engage the low spool and its outer race engage a support extending to an inter-turbine frame between the turbine sections 48 and 50.

A single bidirectional duplex bearing (e.g., two oppositely configured unidirectional ball or roller thrust stages) may also be used as the bearing 220 or other thrust bearing. The close positioning of the two stages may be needed to avoid problems associated with differential thermal expansion of the two bodies (spools or static structure between which the bearings radially intervene). With large gap between stages (e.g., measured as the longitudinal span between the ends of the rolling elements of the first stage and the adjacent ends of the rolling elements of the second stage) differential thermal expansion could either cause bearing disengagement or excessive thrust loads. A small gap (e.g., no more than the individual axial spans of the rolling elements of one or both stages, more broadly no more than 1.5 times twice such axial span) will avoid such problems. In an exemplary gas turbine engine, such a gap may be not more than 30 mm or not more than 25 mm. For example, the intermediate spool and high spool may be subject to greater heating than the case and thus greater thermal expansion. If one of these is supported relative to the case by two widely spaced thrust stages, differential thermal expansion may be a problem.

The core spool may be fully directly supported by two bearings 250 and 260 of which at least one would be a thrust bearing. In the exemplary embodiment, the bearing 250 is a forward bearing grounding a forward portion of the core shaft 52 ahead of the compressor section 44 to the inter-compressor frame 242 via a support 270. The aft bearing 260 grounds a portion of the core shaft 52 intermediate the compressor section 44 and turbine section 46 to a combustor frame via a support 272. In alternative embodiments, this aft bearing 260 might be shifted aft of the turbine section 46 and the support 272 may extend to an inter-turbine frame between the sections 46 and 48. In the exemplary implementation, the bearing 250 is a thrust bearing (e.g., a bidirectional ball bearing with its inner race engaging the core shaft 52 and its outer race engaging the support 270). The exemplary bearing 260 is a straight roller bearing with its inner race engaging the core shaft 52 and its outer race engaging the support 272.

FIG. 1 further shows the FDGS 60 as having a centerplane 516 and the gears as having a gear width $W_G$ and the fan blade array as having a centerplane 518. From fore to aft, the bearings have respective centerplanes 520, 522, 524, 526, 528, 530, 532, and 534.

The axial tying of the fan shaft 120 to another shaft via the thrust bearing 180 may cause thrust loads from the other shaft to counter the aerodynamic thrust loads the fan 28 imparts to the fan shaft 120. This may reduce the net thrust load to be reacted by the bearing 150 and support 152 relative to a baseline engine wherein 150 (either single or duplex) is the only thrust bearing engaging the fan shaft. Thus, the thrust bearing 150 and support 152 may, in at least some embodiments, be made physically smaller (e.g., allowing the engine to be more compact) and/or lighter relative to a baseline engine of equivalent fan size or engine thrust.

The axial tying of the fan shaft 120 (output shaft) to the driving shaft (input shaft 56) by bearing 180 also may, in some embodiments, reduce the required number of bearing supports (e.g., because support 162 replaces separate supports for the two bearings 160 and 180 (or what other bearings would replace these in the hypothetical baseline or comparative engine).

In a further variation, the portion of the fan shaft 120 between the bearings 160 and 180 may be reduced (e.g., allowing bearing 180 to be nested within bearing 160) which may allow further reduction in engine length. For example, in some embodiments the centerplane of bearing 180 may be aligned with, or no more than a short distance behind, the centerplane of bearing 160 (e.g., no more than 15% of a radius of bearing 160, more particularly no more than 10% or 5% where the radius of a bearing is defined as the intersections of the rotational axes of its individual rolling elements with the bearing centerplane).

The use of "first", "second", and the like in the following claims is for differentiation within the claim only and does not necessarily indicate relative or absolute importance or temporal order or positional order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic engine configuration, details of such configuration or its associated environment may influence details of particular implementations. Accordingly, other embodiments are within the scope of the following claims.

What is claimed is:

1. A gas turbine engine comprising:
a propulsor delivering air into a core engine, wherein the propulsor is a fan delivering air into a bypass duct;
a drive gear system including a gear carrier and at least one ring gear, wherein the at least one ring gear is coupled to an engine case of the gas turbine engine with a compliant flexure; and
a drive shaft coupling the gear carrier in the drive gear system to the fan;
wherein a first bearing is forward of the drive gear system for supporting the drive gear system, and a second bearing is aft of the drive gear system for supporting the drive gear system;
wherein the drive gear system includes the at least one ring gear encircling a sun gear, and includes a plurality of intermediate gears positioned between and enmeshing with the sun gear and the at least one ring gear, with the plurality of intermediate gears carried by the gear carrier;
wherein the first bearing includes an inner race configured to rotate with the gear carrier and the second bearing includes an inner race configured to rotate with the gear carrier; and
wherein the second bearing supports the drive shaft relative to a rear support of a static structure, the rear support extending inward from a forward frame of the static structure behind the drive gear system relative to a longitudinal axis of the core engine.

2. The engine as recited in claim 1, wherein one of the first and second bearings is a thrust bearing and the other of the first and second bearings is a non-thrust bearing.

3. The engine as recited in claim 2, further comprising a low spool with a low pressure turbine, wherein the first and second bearings prevent radial excursions and overturning moments produced by the fan during operation, the low pressure turbine has three or more stages, and the drive gear system defines a speed reduction ratio between 2:1 and 13:1.

4. The engine as recited in claim 3, wherein the first bearing is a thrust bearing, and the second bearing being a roller bearing.

5. The engine as recited in claim 1, further comprising a low spool having a low pressure turbine and a low pressure shaft and the drive gear system includes the sun gear, wherein the low pressure turbine has three or more stages, and the drive gear system defines a speed reduction ratio between 2:1 and 13:1.

6. The engine as recited in claim 5, wherein the low pressure shaft has a flexible forward portion.

7. The engine as recited in claim 6, further comprising a high spool with a high pressure turbine and a high pressure shaft, wherein the low pressure shaft has a splined outer diameter surface and the sun gear has a splined inner diameter surface, the splined outer diameter surface of the low pressure shaft is interfitting with the splined inner diameter surface of the sun gear, the high pressure turbine has two stages, and the first bearing is a bidirectional tapered roller bearing.

8. The engine as recited in claim 1, wherein the fan has a plurality of fan blades.

9. The engine as recited in claim 1, further comprising a low pressure turbine with three or more stages, wherein the fan is a single-stage fan and the drive gear system defines a speed reduction ratio between 2:1 and 13:1.

10. The engine as recited in claim 9, further comprising a low spool having a low pressure turbine and a low pressure shaft and the drive gear system includes the sun gear, a third bearing engaging the low pressure shaft and the drive shaft.

11. The engine as recited in claim 10, wherein the low pressure shaft has a flexible forward portion.

12. The engine as recited in claim 11, wherein each of the first bearing and the third bearing is a thrust bearing, and the third bearing is nested within the second bearing relative to the longitudinal axis.

13. The engine as recited in claim 10, wherein the drive shaft is mounted to rotate with the gear carrier as a unit, and the unit engages the first bearing forward of the gear carrier and engages the second bearing aft of the gear carrier.

14. The engine as recited in claim 13, further comprising:
a high spool with a high pressure turbine and a high pressure shaft; and
a fourth bearing engaging the low pressure shaft and a fixed frame, the fixed frame extending across a core flow path of the core engine, and the fixed frame aft of the high pressure turbine with respect to the longitudinal axis of the core engine;
wherein the high pressure turbine has two stages.

15. The engine as recited in claim 10, wherein a centerplane of the third bearing is behind a centerplane of the second bearing by a distance no more than 10% of a radius of the second bearing with respect to the longitudinal axis of the core engine.

16. A gas turbine engine comprising:
a propulsor, wherein the propulsor is a single-stage fan;
a drive gear system including a sun gear encircled by at least one ring gear, a plurality of intermediate gears positioned between and enmeshing with the sun gear and the at least one ring gear, with the plurality of intermediate gears carried by a gear carrier;
a case with the drive gear system coupled to the case via a compliant flexure;
a drive shaft coupling the drive gear system to the fan;
a low spool extending along a longitudinal axis, the low spool including a low pressure turbine driving the drive gear system through a low shaft and the low shaft has a flexible forward portion;
a core spool including a high pressure turbine driving a high pressure compressor through a core shaft;
a first bearing configured to rotate with the gear carrier;
a second bearing located on an opposite axial side of the drive gear system from the first bearing; and
a third bearing engaging the low shaft and the drive shaft;
wherein the drive shaft is mounted to rotate with the gear carrier as a unit, the unit engages the first bearing axially forward of the gear carrier and engages the second bearing axially aft of the gear carrier with respect to the longitudinal axis, the low pressure turbine has three or more stages, the high pressure turbine has two stages, and the drive gear system defines a speed reduction ratio between 2:1 and 13:1.

17. The engine as recited in claim 16, wherein the fan has a plurality of fan blades.

18. The engine as recited in claim 17, wherein the fan delivers a bypass airflow into a bypass duct.

19. The engine as recited in claim 16, wherein the unit engages the first bearing axially forward of the gear carrier and engages the second bearing axially aft of the gear carrier with respect to the longitudinal axis, and the low shaft engages the third bearing, and also engages two additional bearings axially aft of the third bearing with respect to the longitudinal axis.

20. The engine as recited in claim 19, wherein the first bearing is a tapered roller bearing oriented to resist at least forward movement of the drive shaft with respect to the longitudinal axis, and the third bearing is a thrust bearing.

21. The engine as recited in claim 20, wherein:
the third bearing is nested within the second bearing with respect to the longitudinal axis.

22. The engine as recited in claim 16, further comprising:
a fourth bearing engaging the low shaft and a fixed frame;
a fifth bearing engaging the core shaft and the case; and
a sixth bearing engaging the core shaft and the case;
wherein the second bearing is a roller bearing.

23. The engine as recited in claim 22, wherein:
the low shaft includes a spline connection to the sun gear;
the third bearing is a thrust bearing;
the fourth bearing is a roller bearing;
the fifth bearing is a thrust bearing; and
the fixed frame is axially aft of the low pressure turbine with respect to the longitudinal axis.

24. The engine as recited in claim 23, wherein:
a centerplane of the third bearing is behind a centerplane of the second bearing by a distance no more than 10% of a radius of the second bearing with respect to the longitudinal axis.

\* \* \* \* \*